(No Model.)
2 Sheets—Sheet 1.
J. CLOOS.
JUNCTION BOX.
No. 591,226.
Patented Oct. 5, 1897.
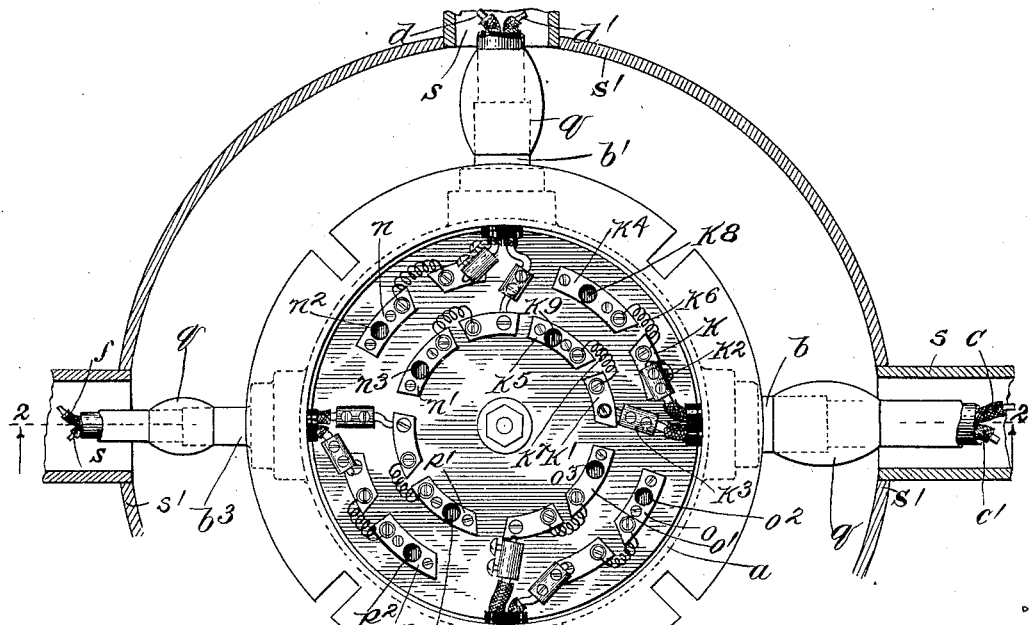
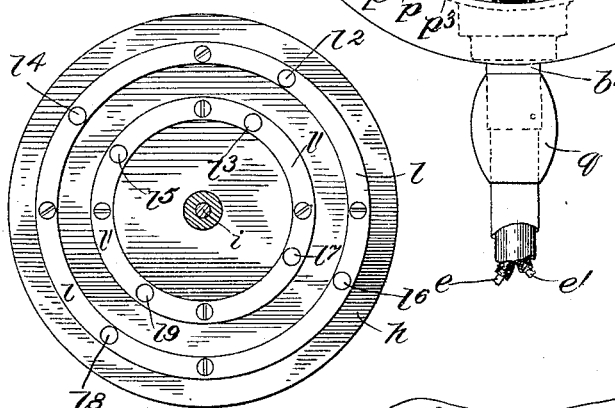
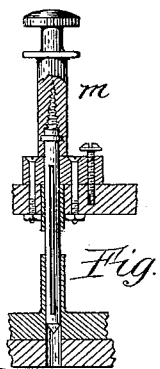
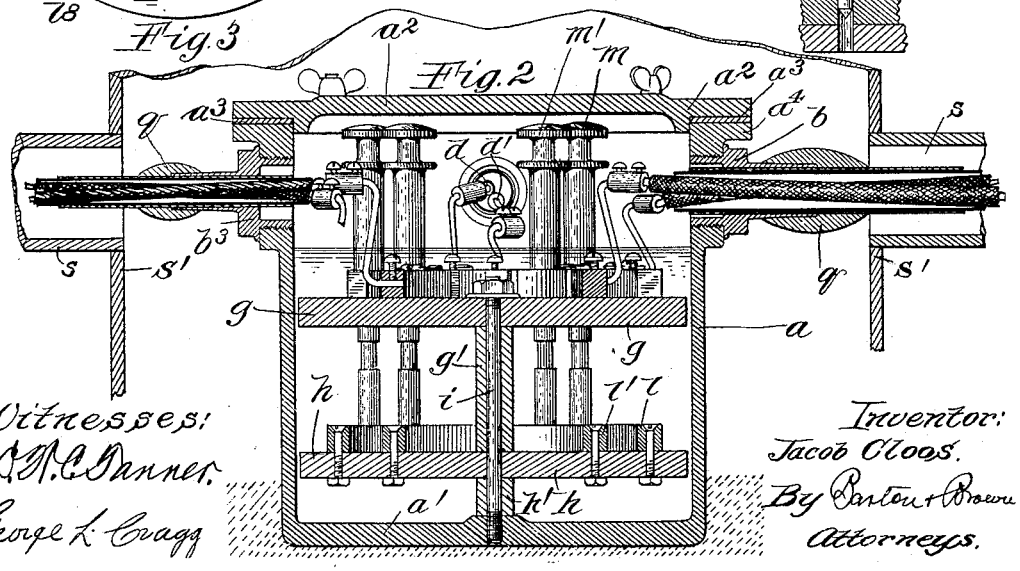
Witnesses:
A. H. C. Danner.
George L. Cragg
Inventor:
Jacob Cloos.
By Barton & Brown
Attorneys.

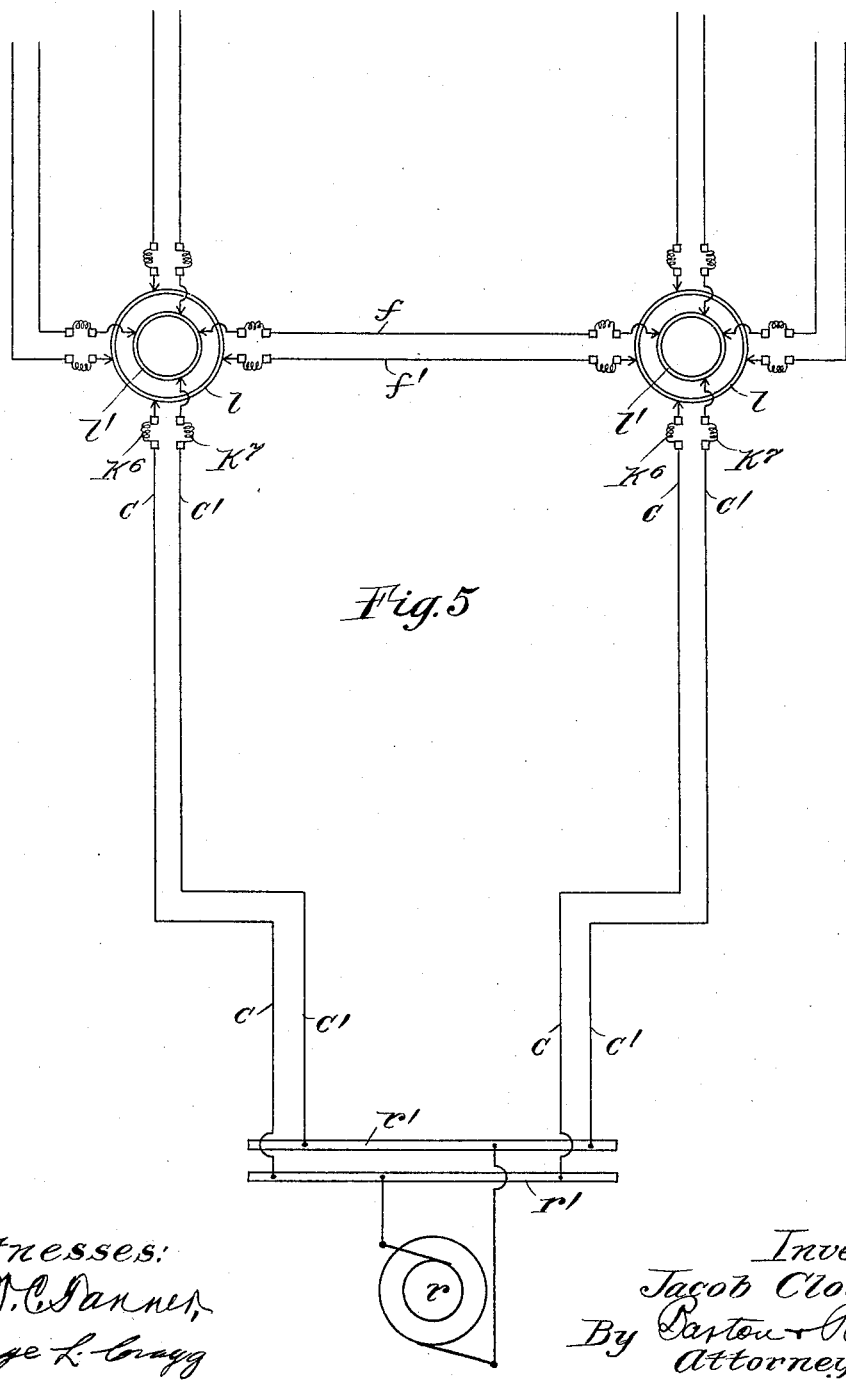

ed the employment of great
UNITED STATES PATENT OFFICE.

JACOB CLOOS, OF MILWAUKEE, WISCONSIN.

JUNCTION-BOX.

SPECIFICATION forming part of Letters Patent No. 591,226, dated October 5, 1897.

Application filed March 6, 1897. Serial No. 626,204. (No model.)

*To all whom it may concern:*

Be it known that I, JACOB CLOOS, a citizen of the United States, residing at Milwaukee, in the county of Milwaukee and State of Wisconsin, have invented a certain new and useful Improvement in Junction-Boxes, (Case No. 1,) of which the following is a full, clear, concise, and exact description, reference being had to the accompanying drawings, forming a part of this specification.

My invention relates to the means employed for effecting the distribution of electricity, and more particularly to junction-boxes to which the feeders are led and from which the mains leading to the district to be supplied with current are distributed.

In modern electrical engineering practice difficulties have arisen in making service connections with feeders conveying high-tension alternating or continuous current, due chiefly to the poor and imperfect means heretofore employed in connecting the mains with the feeders at the manholes, which generally consisted in uniting the feeders and mains by wiped joints. The chief difficulty has been in testing the feeders and mains in distributing systems as thus wired. It was heretofore impossible to test the feeders to locate a defection without first cutting the cable at the manholes to disconnect the mains from the feeder or feeders to be tested, since a test would be impracticable while the mains and feeders were connected, as the mains would then have to be included in the test. Heretofore while the feeder remained dissociated from its distributing-mains during a test the translating devices supplied with current by said mains would be totally inoperative, thus occasioning damage and annoyance. It is also desirable at times to test the mains individually. The method of wiring heretofore used necessitated the employment of great care and much time and labor in severing and reëstablishing connections between the feeders and mains.

It is the object of my invention to provide a junction-box and apparatus within the same whereby any feeder may readily be dissociated from its mains and whereby the mains may individually be dissociated from each other and their feeder.

My invention comprises, generally speaking, a junction-box containing bus-bars or conductors, to each of which a feeder is connected, and switching devices for connecting each bus-bar with the mains which are to be supplied with current from the feeder connected with the bus-bar.

The preferred form of my invention comprises a junction-box in which is disposed a series of contact-plates mounted upon an insulating-support. Each feeder and each main is connected with a contact-plate, the contact-plates being preferably arranged in circular rows. Beneath these contact-plates are provided circular bus bars or rings mounted upon a second insulating-support, these bus-bars being equal in number to the feeders leading to the junction-box. The aforesaid contact-plates to which the feeders are united are connected with these circular bus-bars by means of connecting-plugs. The mains to be supplied are connected with the charged bus-bars by means of plugs which electrically connect the same with the contact-plates to which the mains are connected. To avoid injurious sparking between the plugs and the bus-rings as the plugs are engaged therewith and removed therefrom, I place oil, preferably kerosene, in the junction-box in sufficient amount to immerse the contact-plates and bus-rings.

I will describe my invention more particularly by reference to the accompanying drawings, which show the preferred embodiment of my invention, in which—

Figure 1 is a plan view of a junction-box constructed in accordance with my invention, the connecting-plugs being removed for clearness. Fig. 2 is a sectional view thereof on line 2 2 of Fig. 1. Fig. 3 is a plan view of the insulating-support, upon which the bus-rings are mounted. Fig. 4 is a detail view, partially in vertical section, of a plug in position. Fig. 5 is a diagrammatic view showing two junction-boxes so arranged in relation to each other that upon the failure of any of the feeders to supply current to the mains connected therewith the feeders leading to the other junction-box may be brought into service.

Like letters refer to like parts throughout the different figures.

The junction-box $a$ is preferably of cylindrical shape and formed of cast-iron, having a bottom $a'$ formed integral therewith and a removable cover $a^2$ secured thereto by bolts. To make the junction-box thoroughly watertight, I interpose a lead gasket $a^3$ between the removable cover and a flange $a^4$, formed upon the junction-box. Bushings $b\ b'\ b^2\ b^3$, formed, preferably, of brass, are screwed into tapped holes provided near the top of the junction-box. The feeders $c\ c'$ are conducted through the bushing $b$, while the mains $d\ d'$ and $e\ e'$ are conducted through the bushings $b'\ b^2$. The auxiliary feeders $f\ f'$, which extend between the junction-boxes and which are to be used in case the feeders leading to any junction-box are disabled, as will be more fully hereinafter set forth, are conducted through the bushing $b^3$.

Two circular supports $g$ and $h$ are mounted upon the bottom $a'$ of the junction-box, the lower support $h$ being mounted upon a cylindrical distance-piece $h'$, interposed between the same and the bottom of the junction-box, while the upper support $g$ is mounted upon a cylindrical distance-piece $g'$, interposed between the supports $g$ and $h$. A bolt $i$ is passed through the supports $g$ and $h$ and the distance-pieces $g'$ and $h'$ into the bottom of the junction-box to firmly secure the supports in position. The feeders, mains, and auxiliary feeders extend for a short distance within the junction-box. Terminal plates $k\ k'$ are provided with terminal stems preferably secured thereto by means of binding-screws, couplers $k^2\ k^3$ being provided to unite said stems with the feeders $c\ c'$, respectively. The terminal plates $k\ k'$ are connected with contact-plates $k^4\ k^5$ through protecting-fuses $k^6\ k^7$.

Upon the support $h$ are mounted the circular bus bars or rings $l\ l'$. The plates $k^4\ k^5$ are provided with sockets $k^8\ k^9$, arranged in vertical alinement with sockets $l^2\ l^3$, formed in the rings $l\ l'$. Plugs $m\ m'$, constructed, preferably, as shown in Fig. 4, are adapted to be passed through the sockets formed in the plates $k^4\ k^5$ into the sockets $l^2\ l^3$, whereby said rings are charged, each feeder being connected with a ring. The mains $d\ d'$ and $e\ e'$ are likewise connected with plates $n\ n'$ and $o\ o'$, in which are provided sockets $n^2\ n^3$ and $o^2\ o^3$, through which conducting-plugs may be passed into sockets $l^4\ l^5$ and $l^6\ l^7$, respectively, in the rings $l\ l'$. The auxiliary feeders $f\ f'$ are similarly connected with the plates $p\ p'$, provided with sockets $p^2\ p^3$, through which connecting-plugs are adapted to be passed into sockets $l^8\ l^9$ in the rings $l\ l'$.

I fill the junction-box with oil, preferably to the level indicated in Fig. 2, to cover the contact-plates $k^4\ k^5$, &c. This oil is provided for the purpose of preventing injurious sparking between the plugs and the bus-rings as the plugs are engaged with and removed from the sockets in the bus-rings. The stems connected with the contact-plates $k^4\ k^5$, &c., are free of insulation for the purpose of preventing the oil from traveling along the insulated wires by capillary attraction, whereby I am enabled to prevent the impairment of the insulating-covering of the wires by the injurious action of the oil. The plugs for effecting connection between the bus-rings upon support $h$ and contact-plates upon support $g$ are preferably constructed as shown in Fig. 4. The shanks of the plug are provided with longitudinal saw-cuts for the purpose of affording a spring-like engagement between the same and the parts engaged thereby.

Cables which conduct alternating currents are laid in conduits formed of earthenware material for the purpose of preventing leakage and accidental grounds. As is well known, cables are generally constructed with lead casings, and where cables of this class are employed for the purpose of conducting alternating currents these lead coverings become statically charged, producing a condenser effect, which retards the current. To overcome this defect, I unite the cables passing through the conduits $s\ s$ and extending from the man hole $s'$, in which the junction-box is located, with the brass bushings, through which they are extended by wiped joints $q\ q$, a path for removing the static charges in the lead coverings about the cables being thus provided through the bushings and the grounded junction-box.

Referring to Fig. 5, I have shown the peculiar adaptability of my invention to the purpose of supplying distributing-mains with current in the event of the disability of the feeders connected with said mains. I have shown a generator $r$, having its poles connected with bus-bars $r'\ r'$, from which the feeders $c\ c'$ are led to the junction-boxes $a\ a$, in the manner heretofore described. If now, for example, any of the feeders, as $c\ c'$, shown upon the left of the drawings, should become disabled, the auxiliary feeders $f\ f'$ are connected with the bus-rings $l\ l'$ of each of the junction-boxes, whereby the feeders remaining in circuit may supply not only the mains normally connected therewith, but also the mains connected with the disabled feeders.

It is clear that the details of my improved form of junction-box may be modified without departing from the principles involved.

I have purposely omitted the description of details and the enumeration of many modifications which may be made without departing from the principles of my invention.

Having, however, fully set forth one type of apparatus embodying my invention and the means for practicing the same, I claim, and desire to secure by these Letters Patent, together with all such modifications as may be made by mere skill and with only the limitations expressed or by law implied in view of the related arts, the following:

1. The combination with a junction-box, of feeder and main conductors leading thereto and extending therefrom, a bus bar, bars, or conductors with which the feeder or feeders are connected, and switching mechanism for uniting the mains with said bus bar or bars, substantially as described.

2. The combination with a junction-box, of feeder and main conductors leading thereto and extending therefrom, a support $g$, contact-plates carried by said support to which the feeder and main conductors are connected, a second support $h$, a bus bar or bars carried thereby, and plugs for electrically connecting said contact-plates with said bus bar or bars, substantially as described.

3. The combination with a junction-box, of feeder and main conductors leading thereto and extending therefrom, a support $g$, contact-plates carried by said support to which the feeder and main conductors are connected, a second support $h$, a bus bar or bars carried thereby, said supports being arranged in horizontal planes with support $g$ disposed above support $h$, and plugs for connecting said bus bar or bars with said plates, oil being provided within said junction-box to a depth sufficient to immerse the contact portions of said bus bar or bars that are initially engaged by said plugs, substantially as described.

4. In a system of electrical distribution, the combination with a plurality of junction-boxes, of bus-bars or conductors located therein, feeders and mains connected with said bus-bars, auxiliary feeders extending between the junction-boxes, and switching mechanism for uniting said auxiliary feeders with said bus-bars, substantially as described.

5. The combination with a junction-box, of feeder and main conductors leading thereto and extending therefrom, terminal plates having conducting-stems, connectors, as $k^2 k^3$, for uniting said stems and conductors, and switching mechanism for uniting the feeding and main conductors, said stems, plates and switching mechanism being immersed in oil, substantially as described.

In witness whereof I hereunto subscribe my name this 1st day of March, A. D. 1897.

JACOB CLOOS.

Witnesses:
GEORGE L. CRAGG,
ALBERT LYNN LAWRENCE.